United States Patent [19]
Longley et al.

[11] Patent Number: 5,412,048
[45] Date of Patent: May 2, 1995

[54] PROCESS FOR PRODUCING CROSS-LINKED MONODISPERSED POLYMERIC PARTICLES

[75] Inventors: Kathryn L. Longley, Saratoga Springs; John C. Schmidhauser, Schenectady, both of N.Y.

[73] Assignee: General Electric Company, Schenectady, N.Y.

[21] Appl. No.: 96,239

[22] Filed: Jul. 26, 1993

[51] Int. Cl.$^6$ .............................................. C08F 2/06
[52] U.S. Cl. .................................... 526/212; 524/547; 524/551; 524/555; 524/559; 524/562; 524/566; 524/765; 524/766
[58] Field of Search ............... 524/765, 766, 547, 551, 524/555, 559, 562, 566; 526/212

[56] References Cited

U.S. PATENT DOCUMENTS

| | | | |
|---|---|---|---|
| 3,931,092 | 1/1976 | Ramlow et al. | 524/765 |
| 3,971,744 | 7/1976 | Hudecek et al. | 524/765 X |
| 4,749,506 | 6/1988 | Kitahara et al. | 524/765 X |
| 5,238,992 | 8/1993 | Outubuddin | 524/765 X |

FOREIGN PATENT DOCUMENTS 0330153 2/1989 European Pat. Off. .

OTHER PUBLICATIONS

Almog et al., *British Polymer Journal* 14, 131–136 (1982).
Ober et al., *Journal of Polymer Science: Polymer Letters Edition*, vol. 23, 103–108 (1985).
Tseng et al., *Journal of Polymer Science* 24, 2995–3007 (1986).

*Primary Examiner*—Judy M. Reddick
*Attorney, Agent, or Firm*—Edward A. Squillante, Jr.; William H. Pittman

[57] ABSTRACT

Spherical monodispersed polymeric particles are prepared from vinyl monomers and crosslinking polymerizable polyvinyl monomers. More particularly, a novel process for producing spherical monodispersed gel particles that are about 1–6 μm in size and contain at least about 0.5 to about 3 weight percent (based on polymerizable vinyl monomer/vinyl polymer) of a polymerizable polyvinyl monomer is disclosed. The process comprises the steps of combining an isoalkanol solvent, a polymerizable vinyl monomer and a crosslinking polymerizable polyvinyl monomer under timed and monitored conditions.

13 Claims, No Drawings

PROCESS FOR PRODUCING CROSS-LINKED MONODISPERSED POLYMERIC PARTICLES

FIELD OF THE INVENTION

This invention relates to a process for producing polymeric particles. More particularly, the invention relates to a novel process for crosslinking polymerizable vinyl monomers with polymerizable polyvinyl monomers in order to produce spherical monodispersed polymeric particles.

BACKGROUND OF THE INVENTION

Vinyl polymers, such as polystyrenes, are a well known class of materials discovered in the laboratory over 100 years ago. They are light weight, easy to mold and able to maintain their dimensions under adverse temperature conditions. Because of their favorable properties, these materials are used in many commercial applications. Such applications include foam insulators, drinking cups and even refrigerator doors.

Commercial methods have been developed which utilize polyfunctional comonomers to crosslink vinyl polymers. The resulting crosslinked products are typically bulk solids, oddly shaped agglomerated polymeric particles or spherical polymeric particles. Often, said crosslinked products find use in applications where increased dimensional stability and modified viscoelastic properties are desired.

It has been of increasing interest to prepare crosslinked spherical polymeric particles that are monodispersed. The monodispersed polymeric particles can function as calibration standards for microscopy and diffusivity measurement techniques as well as carriers for bioactive substances which include pesticides and other theropeutic agents. Further, crosslinked monodispersed polymeric particles mix uniformly in liquids and polymeric matrices and therefore can enhance the flow and dispersion properties of such mixtures. Better flow and dispersion properties favorably affect the processibility and physical and surface appearance properties of mixtures which contain polymeric particles.

The instant invention, therefore, is based on the discovery of a novel process for producing crosslinked spherical monodispersed polymeric particles. Said crosslinked spherical monodispersed polymeric particles are about 1–6 μm in size and they often contain at least about 0.05 to about 10 weight percent but preferably at least about 0.5 to about 3 weight percent (based on total polymerizable vinyl monomer/vinyl polymer) of a polymerizable polyvinyl monomer. It is noted that the crosslinked polymers of the instant invention are often referred to as gels. Additionally, novel embodiments of the instant invention include the use of a specific dispersion polymerization solvent as well as timed and monitored additions of said crosslinking polymerizable polyvinyl monomer.

DESCRIPTION OF THE PRIOR ART

Processes for preparing polymeric particles are disclosed in the art. In Almog et al., *British Polymer Journal* 14, 131–136 (1982) a process is disclosed for producing monodispersed polymer particles via a dispersion polymerization process. In said process, a vinyl monomer is combined with a stabilizer, initiator and alcohol solvent in order to produce non-crosslinked polymeric particles.

Additionally, in Tseng et al., *Journal of Polymer Science* 24, 2995–3007 (1986) efforts are disclosed to prepare polymer particles via dispersion polymerizations carried out in an ethanol solvent. As a result of said efforts, polystyrene polymers were obtained as coagulum and/or oddly shaped polymer particles whenever the crosslinking monomer level was greater than 0.3 weight percent based on total weight of the crosslinked polymer.

In view of the above, no dispersion polymerization techniques are disclosed that successfully produce uniform discrete polymeric particles when a crosslinking monomer is employed at concentrations greater than about 0.3 weight percent based on total weight of the crosslinked polymer.

The instant invention is patentably distinguishable from the above-mentioned references, since among other reasons, it describes a novel process for producing spherical monodispersed gel particles that are about 1–6 μm in size and often contain at least about 0.05 to about 10 weight percent but preferably at least about 0.5 to about 3 weight percent of a crosslinking polymerizable polyvinyl monomer.

SUMMARY OF THE INVENTION

The instant invention is based on the discovery of a novel process for producing spherical monodispersed gel particles that are about 1–6 μm in size and often contain at least about 0.05 to about 10 weight percent but preferably at least about 0.5 to about 3 weight percent of a crosslinking polymerizable polyvinyl monomer.

The vinyl monomers polymerized to produce the vinyl polymers of the instant invention include those represented by the formulae

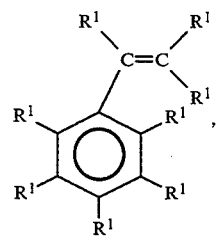

I

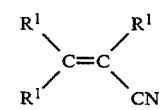

II or

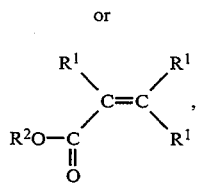

III wherein each $R^1$ is independently a hydrogen, lower alkyl ($C_1$–$C_5$ hydrocarbon), halogen, nitrile group (—CN), nitro group (—$NO_2$), sulfonate group (—$SO_3R^2$) or ester group

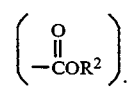

Each $R^2$ is independently a hydrogen or lower alkyl as defined above.

Further, it is often preferred that formulae I, II and III are styrene, acrylonitrile and methyl methacrylate respectively. Moreover, the vinyl polymers described above may employ one or all of the vinyl monomers depicted by formulae I, II and III.

Preferably, the vinyl polymer described above is a styrene acrylonitrile copolymer, wherein the ratio of styrene monomers to acrylonitrile monomers in the copolymer is from about 5 to 95% by weight of the former and about 95 to 5% by weight of the latter.

The crosslinking polymerizable polyvinyl monomers of the instant invention include monomers represented by the formula

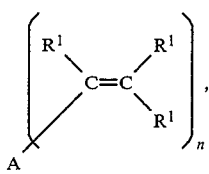
IV wherein n is any integer greater than or equal to 2 and A is a bridging radical which can include substituted or unsubstituted polyvalent aromatic, heterocyclic or polycyclic compounds or structural units represented by the formulae

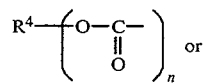
V or

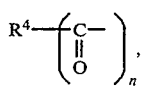
VI wherein n is any integer greater than or equal to 2 and $R^1$ is as defined above and $R^4$ is a polyvalent lower alkyl group (as defined above) or a polyvalent substituted or unsubstituted aromatic compound. It is often preferred that the polyvinyl monomer is divinylbenzene.

It should be noted that in the instant invention the term "vinyl polymer" is not intended to be limiting and includes oligomers, graft polymers, block polymers, terpolymers or the high molecular weight polymers that are often referred to as thermoplastic or elastomeric blends.

The structures depicted hereinabove are not limited to any sterioisomeric (cis- or trans-) arrangement. Th cis- and trans-isomers may be separated by conventional methods such as fractional crystallization or flash column chromatography.

Moreover, important aspects of the instant novel process include the use of a specific dispersion polymerization solvent as well as timed and monitored crosslinking polymerizable polyvinyl monomer addition in order to unexpectedly produce spherical monodispersed gel particles that are about 1-6 μm in size and often contain at least about 0.05 to about 10 weight percent but preferably at least about 0.5 to about 3 weight percent of a crosslinking polymerizable polyvinyl monomer.

Additional features and advantages of the instant invention will be made evident upon reference to the following detailed description.

DETAILED DESCRIPTION OF THE PREFERRED EMBODIMENTS

Dispersion polymerization as a means of forming monodispersed gel particles in the 1-6 μm size range is known. However, no efforts have been disclosed which produce monodispersed gel particles in the above-mentioned size range that are crosslinked with at least about 0.5 to about 3 weight percent of a polymerizable polyvinyl monomer. In accordance with Tseng et al. (referenced above) the use of small amounts of crosslinking monomer (0.6% based on polymerizable vinyl monomer/vinyl polymer) resulted in broadly dispersed particle sizes, oddly shaped particles as well as coagulum.

In accordance with the present invention, the spherical monodispersed gel particles that are about 1-6 μm in size and contain at least about 0.5 to about 3 weight percent of a crosslinking polymerizable polyvinyl monomer are produced via a novel dispersion polymerization process which comprises the steps of combining:

(a) an isoalkanol solvent;
(b) a polymerizable vinyl monomer; and
(c) a crosslinking polymerizable polyvinyl monomer under timed and monitored conditions.

Said timed and monitored conditions comprise the steps of adding up to about 50% of the total amount of crosslinking polymerizable polyvinyl monomer at the start of the polymerization reaction and adding the remainder of said crosslinking polymerizable polyvinyl monomer in equal amounts or continuously until the polymerization reaction is at about 50% completion. The isoalkanol solvent referred to above is isopropyl alcohol, isobutyl alcohol or a mixture thereof. It is noted that often a total amount of at least about 0.05 to about 10 weight percent and preferably about 0.5 to about 3 weight percent (based on total weight of polymerizable vinyl monomer/vinyl polymer) of polymerizable polyvinyl monomer is added to the instant polymerization process to produce crosslinked spherical monodispersed polymeric particles with the above-mentioned weight percents. Therefore, about 100% polymerization is expected.

The progress of the polymerization reaction may be monitored by determining the amount of polymerizable vinyl monomer remaining in the reaction. Such monitoring may be accomplished by conventional analytical techniques which include proton and carbon 13 nuclear magnetic resonance, gas chromatography and high pressure liquid chromatography.

Additionally, it should also be noted that polymerization reaction means the polymerization of vinyl monomers such as those described by formulae I, II and III to produce a vinyl polymer as well as the polymerization (crosslinking) of the polyvinyl monomers such as those described by formula IV to the vinyl polymer described above.

It is further noted that the above-mentioned reaction may be heated to about 70° C. in an inert atmosphere and stirred by conventional methods such as a mechanical stirrer in order to enhance reaction conditions.

Moreover, any of the known radical initiators and stabilizers may be employed in the instant process. Said radical initiators can include, for instance, azobisisobutironitrile and benzoyl peroxide. The stabilizers mentioned above may include all conventional stabilizers such as polyvinyl pyrrolidine and methyl tricaprylyl ammonium chloride.

The following examples and table are to further illustrate and facilitate the understanding of the invention.

EXAMPLE 1

A 3L three-neck round-bottom flask equipped with a reflux condenser, nitrogen inlet, mechanical stirrer, thermometer and heating mantle attached to a temperature controller was charged with 1600 mL isopropyl alcohol (solvent), 28 g polyvinylpyrrolidine (average molecular weight 40,000), 8 g of an ammonium salt (tricaprylylmethyl ammonium chloride), 200 g styrene monomer, 2 g azobisisobutronitrile and 1.3 g (0.5 weight percent based on styrene monomer) divinylbenzene (75% purity obtained from Dajak Laboratories, Inc.) in order to produce a reaction solution. Nitrogen gas was bubbled through the solution for about 15 minutes to expel air. The reaction mixture was then heated to about 70° C. under a nitrogen blanket and stirred. After about 1 hour, an additional 1.3 g (0.5 weight percent) of divinylbenzene was added bringing the total amount of divinylbenzene to 2.6 g (1.0 weight percent). Heating was continued for about 12-24 hours until HF $^1$H NMR indicated less than about 5.0% of the styrene monomer remaining. Subsequent to cooling to room temperature, a precipitate was recovered by filtration. The precipitate was twice redispersed in a solvent (methanol) and isolated by filtration in order to obtain crosslinked polymeric particles. The particles were air dried, ground and vacuum dried at about 50° C. for about 24 hours. Scanning electron microscopy was used to confirm production of 165 g of uniform monodispersed spherical particles approximately 1-2 μm in size crosslinked with about 1.0 weight percent (based on styrene monomer) divinylbenzene.

EXAMPLE 2

A 2L three-neck round-bottom flask equipped with a reflux condenser, nitrogen inlet, mechanical stirrer, thermometer and heating mantle attached to a temperature controller was charged with 1600 mL isopropyl alcohol (solvent), 28 g polyvinylpyrrolidine (average molecular weight 40,000), 8 g of an ammonium salt (tricaprylylmethyl ammonium chloride), 200 g styrene monomer, 2 g azobisisobutronitrile and 0.8 g (0.3 weight percent based on styrene monomer) divinylbenzene (75% purity obtained from Dajak Laboratories, Inc.) in order to produce a reaction solution. Nitrogen gas was bubbled through the solution for about 15 minutes to expel air. The reaction mixture was then heated to about 70° C. under a nitrogen blanket and stirred. After about 3 hours, an additional 2.25 g (0.85 weight percent) of divinylbenzene was added. About 1 hour later, a final addition of 2.25 g (0.85 weight percent) of divinylbenzene was made bringing the total amount of divinylbenzene to 5.3 g (2.0 weight percent). Heating was continued for about 12-24 hours until HF $^1$H NMR indicated less than about 5.0% of the styrene monomer remaining. Subsequent to cooling to room temperature, a precipitate was recovered by centrifugation at about 2800 revolutions per minute for about 30 minutes. The solution was decanted and the precipitate was twice redispersed in a solvent (methanol) and isolated by centrifugation in order to obtain gel particles. The gel particles were air dried, ground and vacuum dried at about 50° C. for about 24 hours. Scanning electron microscopy was used to confirm production of 189 g of uniform monodispersed gel particles approximately 1-5 μm in size crosslinked with about 2.0 weight percent (based on styrene monomer) divinylbenzene.

EXAMPLE 3

A 2L three-neck round-bottom flask equipped with a reflux condenser, nitrogen inlet, mechanical stirrer, thermometer and heating mantle attached to a temperature controller was charged with 1600 mL isopropyl alcohol (solvent), 28 g polyvinylpyrrolidine (average molecular weight 40,000), 8 g of an ammonium salt (tricaprylylmethyl ammonium chloride), 150 g styrene monomer, 50 g acrylonitrile, 2 g azobisisobutronitrile and 1.0 g (0.38 weight percent based on styrene monomer) divinylbenzene (obtained from Dajak Laboratories, Inc.) in order to produce a reaction solution. Nitrogen gas was bubbled through the solution for about 15 minutes to expel air. The reaction mixture was then heated to about 70° C. under a nitrogen blanket and stirred. After about 2 hours, an additional 3.5 g (1.31 weight percent) of divinylbenzene was added. About 1 hour later, a final addition of 3.5 g (1.31 weight percent) of divinylbenzene was made bringing the total amount of divinylbenzene to 8.0 g (3.0 weight percent). Heating was continued for about 12-24 hours until HF $^1$H NMR indicated less than about 5.0% of the styrene monomer remaining. Subsequent to cooling to room temperature, a precipitate was recovered by filtration. The precipitate was twice redispersed in a solvent (methanol) and isolated by filtration in order to obtain crosslinked polymeric particles. The particles were air dried, ground and vacuum dried at about 50° C. for about 24 hours. Scanning electron microscopy was used to confirm production of 192 g of uniform monodispersed styrene acrylonitrile (SAN) gel particles approximately 1-2 μm in size crosslinked with about 3.0 weight percent (based on styrene and acrylonitrile monomers) divinylbenzene.

The data provided hereinbelow has been compiled to confirm the new and unexpected results obtained when utilizing the isomeric alcohols described above as well as timed and monitored polymerizable polyvinyl monomer additions. All entries have been prepared in the manner described by Examples 1, 2 and 3. Polystyrene was employed as the vinyl polymer and divinylbenzene was the polyvinyl monomer utilized. Additionally, the entries were prepared with 2.0 weight percent (based on styrene monomer) of polyvinyl monomer and the gel particles obtained in entries 3 and 5 were spherical, monodispersed and about 1.5 to about 2.0 μm in size.

| | | Gel Particle Appearance | |
|---|---|---|---|
| Entry | Solvent | Single polyvinyl monomer addition | Timed and monitored polyvinyl monomer addition |
| 1 | ethanol | Partially Agglomerated | Partially Agglomerated |
| 2 | n-propanol | Agglomerated | Partially Agglomerated |
| 3 | isopropyl alcohol | Agglomerated | Spherical Gel Particles |
| 4 | n-butanol | Agglomerated | Partially Agglomerated |
| 5 | isobutyl alcohol | Oddly Shaped Gel Particles | Spherical Gel Particles |
| 6 | 2-ethylhexanol | Agglomerated | Agglomerated |

What is claimed is:

1. A dispersion polymerization process for producing spherical monodispersed gel particles comprising the steps of combining:

(a) an isoalkanol solvent;
(b) at least one polymerizable vinyl monomer; and
(c) a crosslinking polymerizable polyvinyl monomer under timed and monitored conditions, wherein said polymerizable vinyl monomer and said crosslinking polymerizable polyvinyl monomer polymerize in said isoalkanol solvent to produce said spherical monodispersed gel particles and said timed and monitored conditions comprise the steps of:
(a) initially adding up to about 50% of the total amount of polymerizable polyvinyl monomer to said polymerization process while saving what remainder is left from the total amount:
(b) adding said remainder of the total amount of polymerizable polyvinyl monomer in equal amounts or continuously after the polymerization process begins and until said polymerization process reaches about 50% completion: and
(c) monitoring the polymerization process with analytical techniques.

2. A process in accordance with claim 1 wherein said isoalkanol solvent is isopropyl alcohol, isobutyl alcohol or a mixture thereof.

3. A process in accordance with claim 1 wherein said spherical monodispersed gel particles are about 1-6 μm in size.

4. A process in accordance with claim 1 wherein said polymerizable vinyl monomer is represented by the formulae

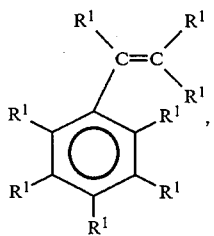

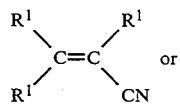

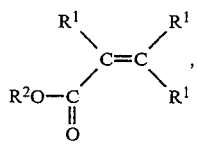

wherein each $R^1$ is independently a hydrogen, lower alkyl, halogen, nitrile group (—CN), nitro group (NO$_2$) sulfonate

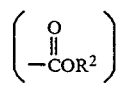

group (—SO$_3$R$^2$) or ester group and each $R^2$ is independently a hydrogen or lower alkyl.

5. A process in accordance with claim 4 wherein said vinyl monomer is styrene, acrylonitrile or methyl methacrylate.

6. A process in accordance with claim 4 wherein said crosslinking polymerizable polyvinyl monomer is represented by the formula

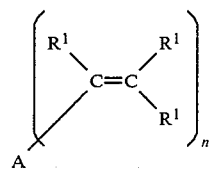

wherein each $R^1$ is independently a hydrogen, lower alkyl, halogen. nitrile group (—CN), nitro group (—NO$_2$), sulfonate group —(SO$_3$R$^2$) or

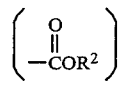

ester group and each $R^2$ is independently a hydrogen or lower alkyl and n is any integer greater than or equal to 2 and A is a substituted or unsubstituted polyvalent aromatic, heterocyclic or polycyclic compound or a structural unit represented by the formulae

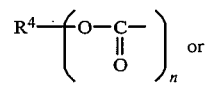

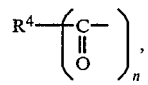

wherein n is any integer greater than or equal to 2 and $R^4$ is a polyvalent lower alkyl or polyvalent substituted or unsubstituted aromatic compound.

7. A process in accordance with claim 6 wherein said crosslinking polymerizable polyvinyl monomer is divinylbenzene.

8. A process in accordance with claim 1 wherein a total amount of at least about 0.05 to about 10 weight percent of the crosslinking polymerizable polyvinyl monomer based on total weight of polymerizable vinyl monomer is added to said polymerization process.

9. A process in accordance with claim 8 wherein said spherical monodispersed gel particles contain at least about 0.05 to about 10 weight percent of the crosslinking polymerizable polyvinyl monomer based on total weight of polymerizable vinyl monomer.

10. A process in accordance with claim 1 wherein a total amount of at least about 0.5 to about 3 weight percent of the crosslinking polymerizable polyvinyl monomer based on total weight of polymerizable vinyl monomer is added to said polymerization process.

11. A process in accordance with claim 10 wherein said spherical monodispersed gel particles contain at least about 0.5 to about 3 weight percent of the crosslinking polymerizable polyvinyl monomer based on total weight of polymerizable vinyl monomer.

12. A process in accordance with claim 1 wherein said analytical techniques are proton and carbon 13 nuclear magnetic resonance, gas chromatography or high pressure liquid chromatography.

13. A process in accordance with claim 1 wherein said polymerizable vinyl monomers are styrene and acrylonitrile and the ratio of styrene monomers to acrylonitrile monomers in the monodispersed gel particles is about 5 to 95% by weight of the former and about 95 to 5% by weight of the latter.

* * * * *